United States Patent [19]

Heverly

[11] 4,040,557
[45] Aug. 9, 1977

[54] ELLIPTICAL SEAM WELDING APPARATUS

[75] Inventor: James S. Heverly, Upper Darby, Pa.

[73] Assignee: Westinghouse Electric Corporation, Pittsburgh, Pa.

[21] Appl. No.: 651,757

[22] Filed: Jan. 23, 1976

[51] Int. Cl.² .............................................. B23K 9/10
[52] U.S. Cl. ...................................... 228/9; 219/124
[58] Field of Search ................ 228/9, 10, 11; 219/124

[56] References Cited

U.S. PATENT DOCUMENTS

| | | | |
|---|---|---|---|
| 2,472,951 | 6/1949 | Klinke | 228/9 X |
| 3,095,501 | 6/1963 | Goekler et al. | 219/124 |
| 3,126,472 | 3/1964 | Brems | 219/124 |
| 3,216,641 | 11/1965 | Brems | 228/9 X |

Primary Examiner—Al Lawrence Smith
Assistant Examiner—K. J. Ramsey
Attorney, Agent, or Firm—F. J. Baehr, Jr.

[57] ABSTRACT

An apparatus for welding the circumference of an elliptical member is characterized by welding torch movably mounted on a support framework. A turntable rotates the elliptical member at a variable speed so that the travel under the welding torch is constant and that each point of the circumference of the elliptical member is successively the greatest distance above a horizontal reference datum. A control arrangement is provided to move the welding torch along the support framework so as to locate the torch adjacent each successive point on the elliptical member that is the greatest distance above the horizontal datum.

7 Claims, 12 Drawing Figures

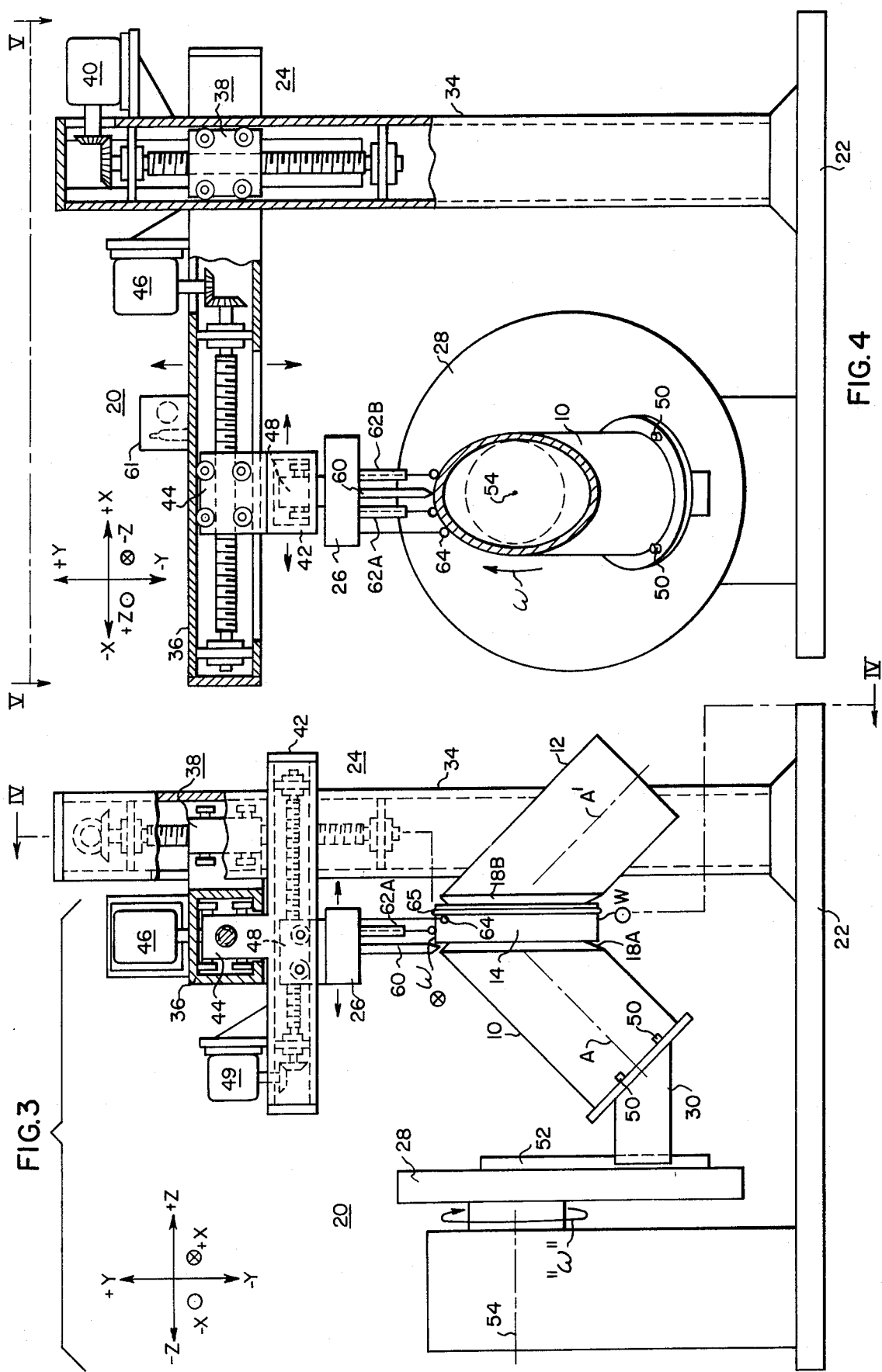

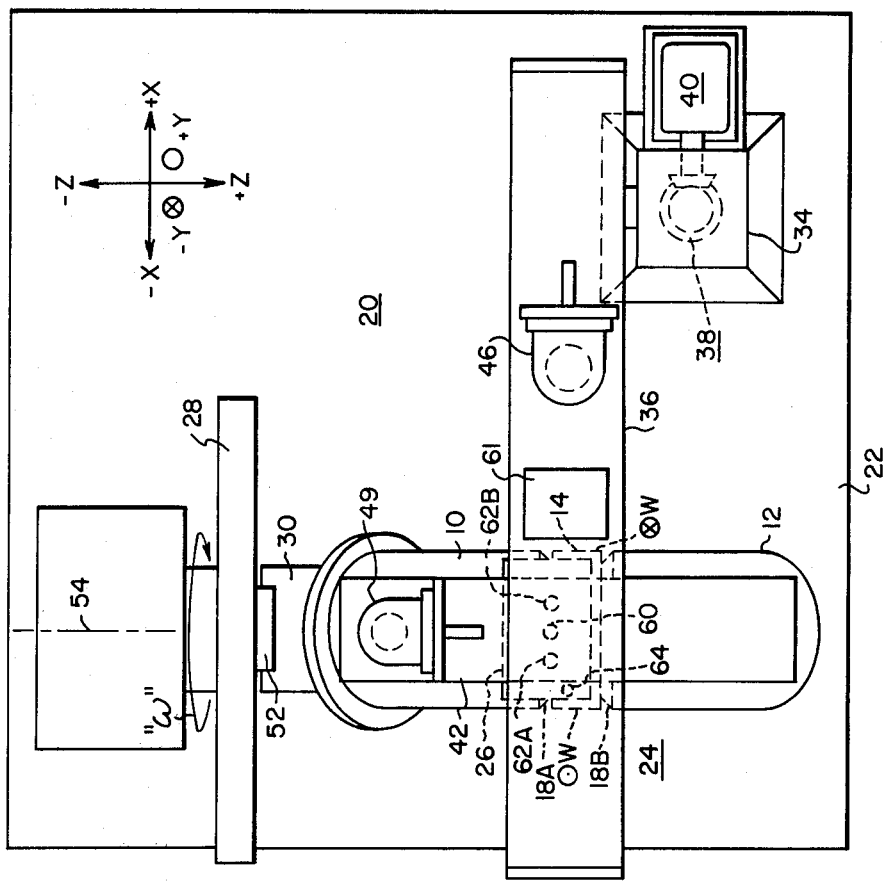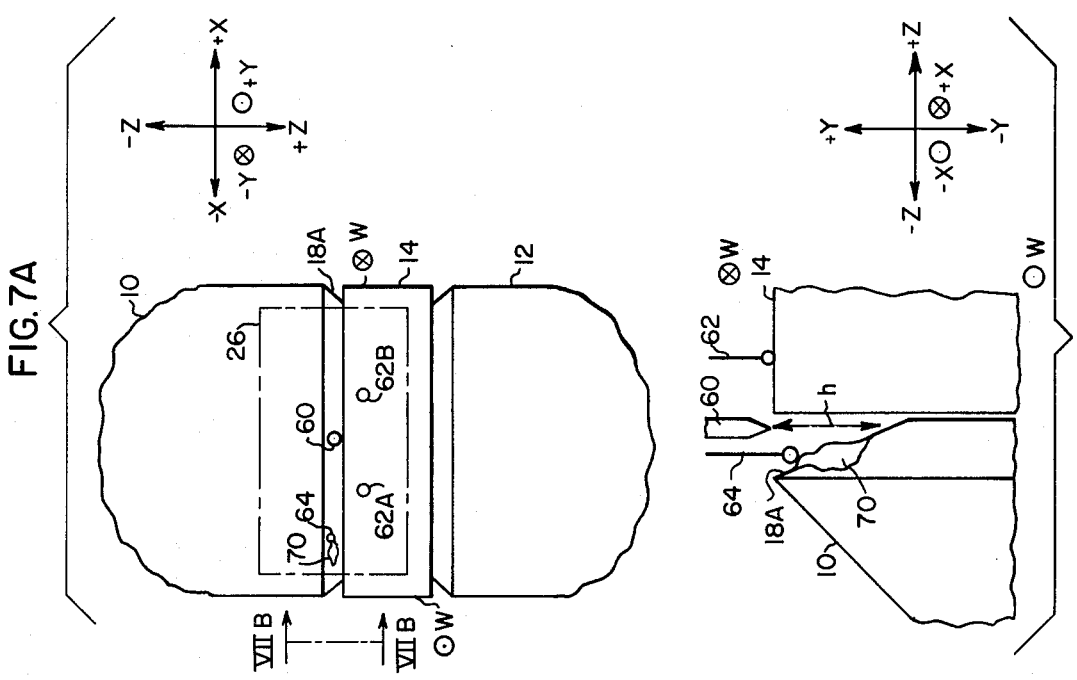

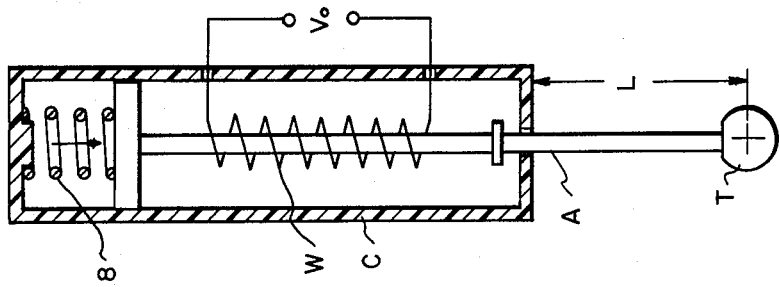
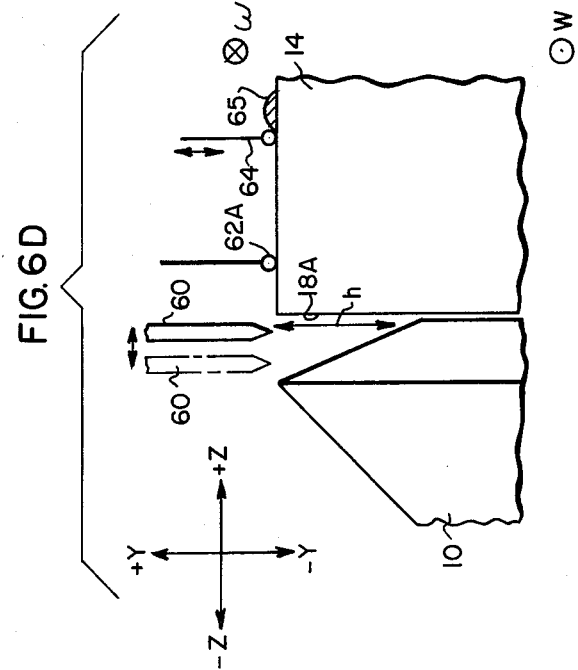
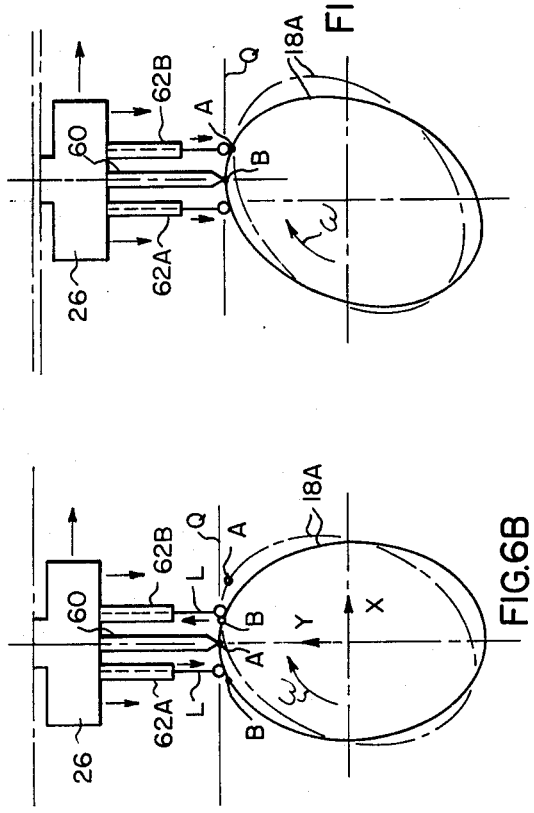
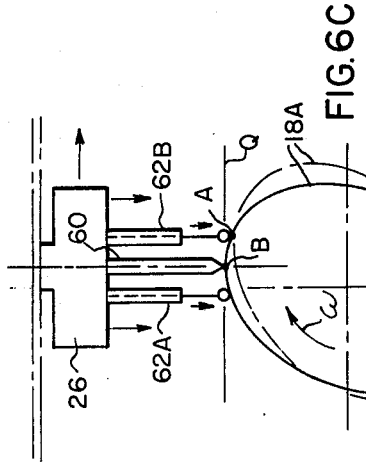
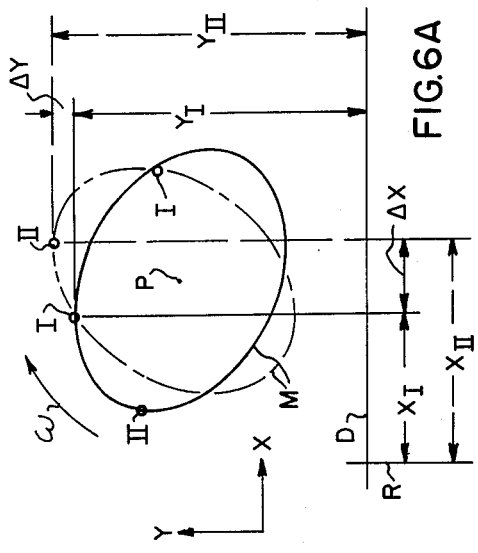

ELLIPTICAL SEAM WELDING APPARATUS

BACKGROUND OF THE INVENTION

1. Field of the Invention

This invention relates to welding apparatus and in particular, to a welding apparatus able to follow and weld an elliptical seam.

2. Description of the Prior Art

It is well known that in the fabrication of miter joints in metal cylindrical vessels, it is a difficult and time consuming task to properly weld the elliptical joints formed by the miter. Such welding problems usually arise in the fabrication of steam turbine systems where it is required that piping make severely angled turns in order to conduct fluid from one part of the system to another.

In the past, once a miter end of a pipe has been prepared and properly beveled it is necessary to hand weld the elliptical seam presented by the geometrical configuration of the elements. This is both time consuming, expensive and leads to the possibility of welding imperfections which jeopardize the security of the weld.

The provision of an apparatus to accomplish the welding process requires at a minimum the provision of means for rotation the member to be welded at a particular predetermined constant speed relative to the welding torch, and further, in order to avoid runoff of weld material, it is necessary to provide suitable means for tracking the highest point on the elliptical member relative to a fixed horizontal datum. This highest point is known in the art as the "top dead center" point. Such tracking means must be coordinated with means for displacing the welding torch so as to always maintain the torch adjacent this so-called "top dead center" point.

SUMMARY OF THE INVENTION

This invention provides a welding apparatus able to weld elliptical seams in an efficient and expeditious manner. The apparatus comprises a welding torch and associated welding material mounted on a suitable support framework. The elliptical member to be welded is rotated by suitable means at a generally constant linear velocity relative to the welding torch. Further, means are provided for locating the welding torch over each successive highest point on the ellipse above a horizontal datum as the ellipse rotates relative to the torch. Probe means for this purpose are provided and integrated with suitable drive means for moving the torch along the support framework to maintain the proper alignment of the torch with the top dead center point. Further, means are provided for locating the height of the welding torch above the weld preparation once the torch itself has been located adjacent the top dead center point. Both the means for aligning the torch with the top dead center point and the means for locating the height of the welding torch above the weld preparation are integrated with means for rotating the elliptical member at a variable speed so that the weld preparation travels at a constant speed under the welding torch.

It is an object of this invention to provide an apparatus for welding an elliptical seam between a first and a second member. It is a further object of this invention to provide a welding apparatus which includes means for tracking each successively highest point on the ellipse above a predetermined horizontal datum. Other objects of the invention will become clear in the following detailed description of a preferred embodiment which follows herein.

BRIEF DESCRIPTION OF THE DRAWINGS

The invention will be more fully understood from the following detailed description of a preferred embodiment, taken in connection with the accompanying drawing, in which:

FIG. 3 is an elevational view of the apparatus for welding elliptical seams embodying the teachings of this invention;

FIGS. 4 and 5, respectively, are elevation and plan views of the apparatus taken along lines IV—IV and V—V in FIG. 3 and FIG. 4;

FIGS. 6A through 6E are schematic representations of the operation of the apparatus embodying the teachings of this invention and the means associated therewith for tracking the top dead center point of the ellipse; and FIGS. 7A and 7B are schematic representations of the operation of a probe means included as an element in the apparatus embodying the teachings of this invention.

DESCRIPTION OF THE PREFERRED EMBODIMENT

Figure 2:
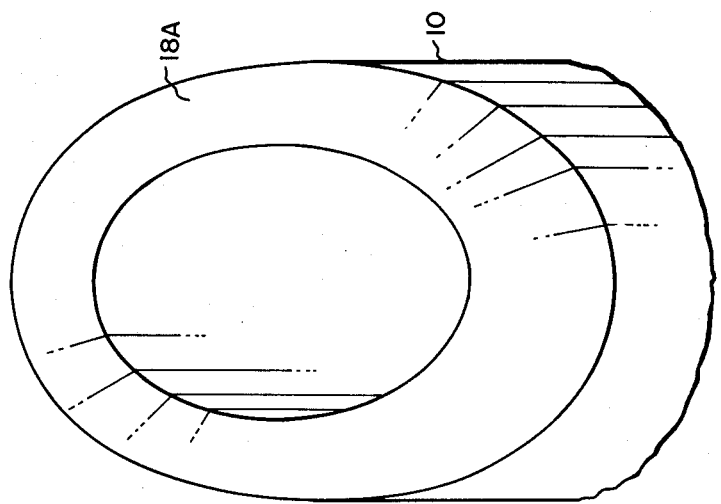
FIGS. 1 and 2, respectively are partial sectional and end views of an elliptical member welded by an apparatus embodying the teachings of this invention.

Throughout the following description, similar of the reference numerals refer to similar elements in all figures of the drawings.

Figure 1:
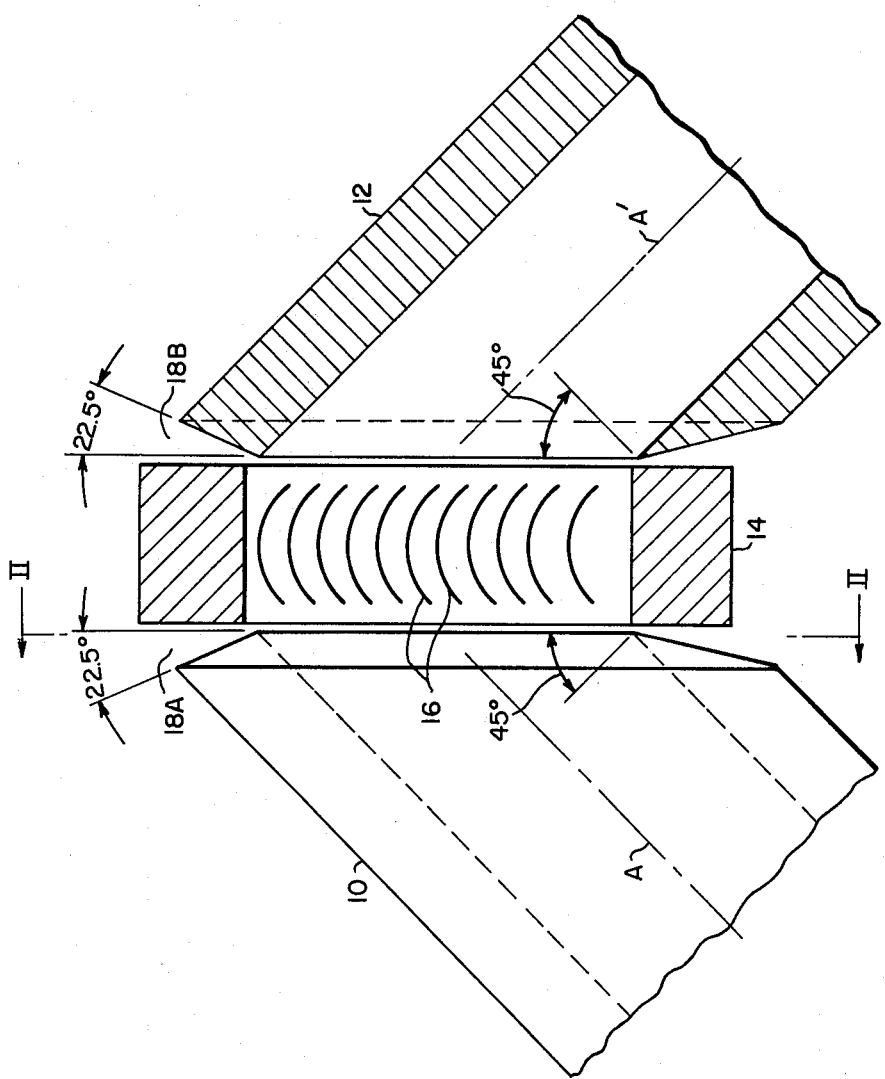

Referring to FIGS. 1 and 2, there is shown respectively, partial sectional and end views of an elliptical member which is welded by apparatus embodying the teachings of this invention. As is known in the art, the typical location for miter joints in a stream turbine power plant is found wherever piping is required to bend, such a at crossover and at crossunder pipes between associated turbine apparatus, and at various other locations in the power plant.

In order to facilitate the turning of the fluid particles from a first pipe or conduit 10 to a second pipe or conduit 12 as those conduits and the axes A and A' therethrough are oriented at a predetermined angle relative to each other (shown in FIG. 1 to be 90°), there is provided an intermediate section known in the art as a shroud 14. The shroud 14 has disposed therein a plurality of turning vanes 16 which efficiently turn the fluid particles from the direction of flow within pipe 10 to the direction of flow within pipe 12.

In order to prepare the extremities of pipes 10 and 12 for jointure with the shroud 14, these extremities must be beveled so that when the adjacent members are joined a suitable weld preparation will be intact at the joints to be welded. In FIG. 1, it is seen that the ends of both the pipes 10 and 12 have a miter corner approximately 45° thereon. Further, it is noted that each miter corner on pipes 10 and 12 have provided thereon a bevel of approximately 22½° relative to the miter disposed about the entire circumference of the pipes 10 and 12. It is of course within the contemplating of this invention to provide a welding machine able to join members of any predetermined miter and bevel angulation, with the angularity of those members described in FIG. 1 being illustrative and not exhaustive.

From the provision of the miter at the extremities of pipes 10 and 12, it is apparent at that these extremities of those pipes define a elliptical outline, as best shown in FIG. 2. Therefore, the conjoining of the elliptical extremities of pipes 10 and 12 with the shroud 14 must of necessity be elliptically shaped. However, no apparatus know by applicant is available in the prior art which would permit the welding an elliptical seam. Such capacity which is provided by the apparatus embodying the teachings of this invention.

Once the extremities of the pipes 10 and 12 have been prepared they are tack welded to the shroud 14 so that a unitary structure consisting of pipes 10 and 12 and shroud 14 may be mounted on the apparatus 20 embodying the teachings of this invention. It is understood of course that the tack welding is provided only as a temporary expedient to maintain the parts to be conjoined in their assembled position during the welding process as carried out by the welding apparatus 20. It may also be seen that having so conjoined pipes 10 and 12 to the shroud 14 there is defined therebetween a first and a second elliptically shaped groove, or weld preparation, respectively, indicated by numerals 18A and 18B. Having thus defined the member to be welded, attention is now directed to FIGS. 3, 4 and 5 in which the construction of apparatus embodying the teachings of this invention is clearly set forth. For ease of identification and for reference, orthogonal axes which indicate respectively, X, Y, and Z directions, are superimposed upon each of the relevant figures.

The welding apparatus 20 comprises a base member 22 having mounted thereon a support framework generally indicated by reference numeral 24 which supports welding and probe head 26. A movable positioner, as that term is known in the art, is generally indicated by reference numeral 28 and has a support fixture 30 on which is mounted the tackwelded arrangement of pipes 10 and 12 and shroud 14.

The support framework 24 comprises a vertically extending mast 34 mounted perpendicularly relative to the base plate 22 and extending along the positive and negative Y axis. Movably mounted with respect to the mast 34 is a perpendicularly disposed boom 36. The boom 36 extends substantially along the positive and negative X direction. In order to facilitate movement of the boom 36 relative to the mast 34 there is provided suitable propelling means, generally indicated by reference numeral 38, and a suitable drive arrangement such as motor 40, connected thereto for moving the boom 36 along the mast 34. It is of course understood that the propelling means 38 and drive means 40 therefor are merely illustrative and not exhaustive but typify and suitable arrangement by which the boom 36 may be moved relative to the mast 34.

The framework 24 also includes a cross piece 42 mounted orthogonally relative to both the mast 34 and the boom 36. Means generally indicated by reference numeral 44 are provided for propelling the cross piece 42 relative to the boom 36. Also, suitable drive means, such as a motor 46 are connected to the means 44 for moving the cross piece 42. The cross piece 42 extends along the positive and negative Z axis.

The weld head 26 is itself movable along the cross piece 42 and suitable propelling means 48 are provided for this purpose. A drive means, such as a motor 49 is connected to the propelling means 48. It may thus be appreciated by reference to the foregoing that the weld head 26 is displaceable along all orthogonal axes. The head 26 itself is directly movably along the cross piece 42 and therefore in the positive or negative Z direction due to action of means 48 driven by the motor 49. The cross piece 42 is itself movable along the boom 36 due to the cooperation between the means 44 driven by the motor 46 which thus permits in direct movement or displacement of the weld head 26 in the positive or negative X direction. Finally, the boom 36 is movable along the mast 34 by the action of the means 38 driven by the motor 40, which effective permits motion of the weld head 26 along the positive or negative Y axis. It may thus be appreciated that applicant provides herein suitable means displacing the weld head 26 along all three orthogonal directions. The necessity of such displacement is pointed out herein.

The positioner 28 has associated therewith the fixture 30 on which the member to be welded (the combination of conduits 10 and 12 with shroud 14 exhibiting elliptical weld preparations 18A and 18B) is mounted through the use of holding means, such as pins 50. The fixture 30 is itself movable along tracks 52 which are provided on the positioner 28 so that any size member to be welded may be expeditiously mounted on the welding apparatus 20 so as to bring the member to be welded within proximity to the weld head 26. The means 28 include any suitable drive means for rotating the fixture 30, and therefore the member to be welded, with a variable angular speed "$\omega$" relative to a predetermined axis of rotation 54 so that the weld preparations 18A and 18B move under the weld head 26 as a controllable generally constant linear speed as the head 26 moves along the positive or negative X and Y directions to remain at the top dead center point of the preparation (which constantly varies above a fixed horizontal datum) and at a constant height above the weld preparations, as will be explained herein.

The weld head 26 includes a welding torch 60, two single-axis locator probes 62A and 62B mounted adjacent the torch 60 and a double axis locator probe 64. Although the probe 64 may be located at any location on the weld preparation 18A (such as in the preparation itself), it is shown in the figures as preloaded against a wire rope 65 affixed to the shroud 14. As will be explained more fully herein, the probes 62A and 62B are electrically associated with the drive means 46, while the probe 64 is electrically associated with the drive means 40 and 48. The interaction and cooperation of the probes 62 and 64, and their associated drives act to determine the "top dead center point" of the elliptical weld preparation 18 at each successive time and to locate the weld torch 60 in proximity thereto. The probes 62A and 62B, as seen best in FIG. 3, are mounted slightly ahead (in the positive Z direction) of the weld torch 60 and guide upon the shroud member 14 while the probe 64 rides on the wires rope 65. There is also mounted at any convenient location on the support framework 24 or adjacent thereto the necessary welding equipment such as shielding gas cylinders and wire reels, as indicted by numeral 61. Any suitable welding material using any welding process may be utilized with the welding machine 20 disclosed herein.

Referring to FIGS. 6A–6E, schematic representation of the principles of operation of the welding machine 20 disclosed herein is shown and which amply illustrates the interaction between the member to be welded mounted on the rotating positioner 28, the locator probes 62 and 64 tracking that member and determining "top dead center" and the response of the associated drive means to the probes 62 and 64. Basic to any understanding of these principles is an understanding of the concept of "top dead center." As earlier defined, "top dead center" is that point on the member being rotated which is, at any given instant, the greatest distance above a reference datum.

In FIG. 6A, such a definition can be readily understood by reference thereto. As seen, a complexly curved member (shown as an ellipse) M is illustrated in two positions by solid and dotted lines as the member M rotates with an angular velocity and a direction ω about a fixed point P. A reference datum D having a reference point R is provided and coordinate axes indicating X and Y directions are superimposed on the FIGURE. Two points of interest, points I and II, have been identified on the member M at each position illustrated. The member M, when in the first position (shown by solid lines), has the point I being the point that is the greatest distance above the datum D. This distance is indicated on the FIGURE as distance $Y_I$. For this instant, point I is the top dead center point of the member M. Note also that when the point I is at top dead center relative to the datum D, the point I also projects onto the datum D at a distance $X_I$ from the reference point R.

As the member M rotates about P with velocity ω to the second position (shown in dotted lines), the second point II is now that point on the elliptical member M that lies the greatest distance above the horizontal datum D, the distance being illustrated as dimension $Y_{II}$. For this instant of time, point II is the top dead center point of the member M. Note also that the point II when at top dead center projects onto the datum D at a distance $X_{II}$ from reference R.

It is apparent that the geometry of the member M results in a different top dead center point as the member M rotates about point P. Note, however, that, relative to the datum D and the reference R, the location of the top dead center point (point I and point II) shifts. In the illustration shown, there occurs a shift in the location of the top dead center point of Δ Y, relative to the datum D, and of Δ X, relative to the reference R. The shifting of top dead center exhibited by the complexly curved member M is a phenomenon not encountered by welding machines in the prior art. This is so because those machines operate to weld circular members, the top dead center point of which (for all times) remains the same distance above a datum and the same distance away from a reference. Thus, to provide a welding machine 20 able to track the top dead center point of a compexly curved member M requires that means be provided thereon which firstly, determines exactly where top dead center is, and secondly, control appropriate drive means able to relocate the welding torch in the vicinity of top dead center. It is, of course, apparent that if the torch attempted to weld at other than top dead center, a runoff of weld material would occur, severely limiting the integrity and security of the joint produced.

Having thus provided the background, it may be seen and understood how the single axis locator probes 62A and 62B and its associated drive means 46, in cooperation with the double axis probe 64 and its associated drive means 40 and 49, operate to determine the location of top dead center, and how these elements respond to that determination to move the weld torch 60 to the vicinity thereof.

Referring now to FIGS. 6B-E, the machine employing the teachings of this invention is depicted in schematic form. The elliptical weld preparation 18A is shown in FIG. 6B and 6C in two cross-sectional positions (similar to the view in FIG. 4) and illustrated by solid and dotted lines and in a side view (similar to FIG. 3) in FIG. 6D. The preparation 18A rotates at speed ω about a point shown by the intersection of the coordinate axes (which corresponds to the axes' orientation in FIG. 4).

Each of the probe locators 62A and 62B is a device which exhibits a predetermined "null" signal when in a certain predetermined orientation, and signals which deviate from that null value as the probes are deviated from that orientation. By way of illustration, each of the probes 62A and 62B (shown schemtically in FIG. 6E) may contain a winding W disposed within a casing C. A magnetic armature A is slidably disposed within the casing C and protrudes therefrom. The armature A terminates in a tip T. The armature may be biased within the casing C by spring S. When a predetermined length of the armature A protrudes from the casing C, a certain output voltage Vo may be observed at the terminals of the winding W. When greater or lesser lengths L of the armature A protrude from the casing C, the voltage varies. The probe 64 may utilize a sliding contact, similar in principle and construction to that shown for the probe 62, and which raises the output voltage thereof as greater and lesser length of its armature extend from its casing.

The probes 62A and 62B are provided on the head 26 in such a way when the torch 60 is in the vicinity of the top dead center point, equal lengths L protrude from each casing of the probes 62a and 62B (FIGS. 6B and 6C). Put another way, when the torch 60 is in the vicinity of the top dead center point, a line passing through both tips of the probes 62A and 62B lies parallel to a horizontal datum, (in FIGS. 6B and 6C, the datum is the X axis).

Thus, in FIG. 6B, if point A is the top dead center point, the tips of the probes 62A and 62B both abut the weld preparation 18A. (In actual fact, the probes are abutted against the shroud 14, FIGS. 3 and 4, but for consistency of numeration, are shown in FIG. 6 as abutting the preparation 18A). As stated, a line Q containing both probe tip is parallel to the X axis. As the preparation 18A rotates relative to probe head 26 at a constant linear speed, point A no longer is the top dead center point due to the geometry of the preparation. Thus, as seen by the superimposition of the dotted preparation 18A, the tip of the probe 62A is forced downward (as shown by the arrow) in order to maintain the abutting contact with the weld preparation thus altering the length of the armature protruding from the casing thereof. Conversely, however, the tip of probe 62B is forced upward by the geometry of the rotating preparation 18A, to alter the length of the protruding armature thereof. Similarly, as the preparation 18A rotates as speed ω, the probe 64, which is preloaded and biased to contact and follow the guide wire rope 65, is also displaced from its null setting.

The alteration of the armature lengths varies the output signals of each probe 62, and a servo mechanism is provided which controls the appropriate drive means 46 to displace the head 26 effectively along the X direction to aid in reestablishing the null setting of each probe 62. Similarly, the probe 64 is associated with both the drive means 40 and 49, and the drive means 40 acts to move the head 26 effectively along the Y axis to help reestablish the null setting for the probe 64. Thus, in FIG. 6B, the movement tending to reestablish the null setting along the X direction is controlled by the probe 62, while the movement in the Y direction is established by the probe 64. In the particular instance shown in FIGS. 6B and 6C, null settings are reestablished if the length of the armature of probe 62A is shortened and that of the probe 62B is lengthened. Thus, signals to the drive means 46 (by the probe 62) and 40 (by the probe 64) are provided which displace the head 26 sufficiently to reestablish a null probe setting about point B, the new top dead center point. Also, movement of the boom 36 in response to the drive means 40 reestablishes a null setting of the probe 64 adjacent the new top dead center point. It is appreciated that the torch 60 is thus brought again into the vicinity of the top dead center point (B, as seen in FIG. 6C), and, again a line Q containing the tips of each probe 62A and 62B is parallel to the datum (the X axis).

In like manner, the probes 62 and 64 follow the member to be welded to ascertain the top dead center point at each instant of time and to actuate the appropriate drive means (46 or 40, respectively, or both) so as to relocate the torch 60 in the vicinity thereof. Thus, as the preparation 18A continues its rotation in the direction ω and at a constant linear speed relative to the torch 60, further successive points on the preparation 18A become the highest point relative to the common horizontal datum (the X axis). In a manner consistent with that described above, the probes 62 and 64 cause the appropriate drive means (40 or 46) to relocate the torch 60 in such a position that the armatures thereof are nulled relative to their respective casings. It is appreciated from the drawings that the location of the reoriented torch 60 is always adjacent to the highest point on the ellipse above the horizontal datum at any particular point of time.

Thus, it may be seen that applicant provides means herein for determining the highest point on the ellipse — the top dead center point — and means for successively relocating the torch 60 adjacent that top dead center point. It will be apparent to those skilled in the art that magnitude of travel of the torch 60 in the X and Y directions is, for a 36 inch diameter conduit 10, equal to approximately 9 inches along the Y axis and equal to approximately 18 inches along the X axis. It is seen that these dimensions are functionally related to the difference between the major and minor axes of the appropriate ellipse.

The importance of providing means for following the top dead center point and for locating the welding torch adjacent thereto is, as stated, to prevent the torch from dropping weld beads or molten weld material in such a location that the weld material runs off along the curvature of the elliptical joint. If the weld torch 60 is located immediately above the top center point weld pool of molten metal is formed on the weld preparation and remain there without running to one side of the elliptical member.

In addition to assisting in locating the top dead center point by interacting with the drive means 40 to locate the head 26 (and the torch 60) along the Y axis, the probe 64 also maintains the torch 60 a predetermined height "$h$" (FIG. 6D) above the root of the weld preparation 18A. The predetermined height $h$ is set prior to initiation of the automatic welding sequence. As the member rotates, the probe 64 follows the wire rope 65. If any deviation is present, the probe 64 actuates the drive means 40 to move the boom 36 to position the torch 60 at the proper height above the root of the preparation 18A.

It is apparent from the foregoing that applicant has provided herein a welding apparatus for welding elliptical joints in a manner not available by any prior art device.

Since numerous changes may be made in the above described construction and different embodiments of the invention may be made without departing from the spirit and scope thereof, it is intended that all subject matter contained in the foregoing description or shown in the accompanying drawings shall be interpreted in the illustrative and not in the limiting sense.

We claim as our invention:

1. Apparatus for welding a complexly, convexly curved member, said apparatus comprising:
    a welding torch;
    means for rotating said convexly curved member at varying angular velocities to produce a predetermined generally constant linear speed relative to said torch;
    a pair of probes disposed in a spaced relation to each other and to said torch, each probe abutting said convexly curved member and responding to variations in distance from a datum plane to produce a signal proportional to said variations;
    means for moving said torch in X and Y directions in response to the signal from said probes to a point on said convexly curved member which point is successively the greatest distance from said datum plane;
    whereby said welding torch forms a weld pool adjacent said point to automatically form a uniform weld adjacent the periphery of said complexly, convexly curved member as said member rotates.

2. Apparatus as set forth in claim 1, wherein the complexly, convexly curved member is elliptical.

3. The apparatus as set forth in claim 1, wherein each probe of the pair has a null position and the pair of probes are disposed in a plane generally perpendicular to the axis of rotation of the convexly curved member and are so disposed in this plane that when in their null position a line through their point of contact with the convexly curved member is generally parallel to the datum plane.

4. The apparatus as set forth in claim 3, wherein the datum plane is generally horizontal.

5. The apparatus as set forth in claim 4 and further comprising a third probe mounted in a spaced relationship with the torch and abutting said convexly curved member, the third probe sending a signal to the moving means in response to variations from a predetermined distance from the datum plane to actuate the moving means to reestablish the null position of the pair of probes and parallelism between the line and the datum plane.

6. The apparatus as set forth in claim 5, wherein a predetermined clearance is set between the torch and the convexly curved member and the third probe responds to deviation in this clearance to send a signal to the moving means to restore the predetermined clearance.

7. The apparatus as set forth in claim 5, wherein the convexly curved member is elliptical and the pair of probes produce signals which activate the moving means to move distances in the Y direction functionally related to the difference between the major and minor axis of the elliptical member and the third probe produces a signal which activates the moving means in the X-direction for a maximum distance functionally related to the difference between the major and minor axis of the elliptical member.

* * * * *